United States Patent
Drake et al.

(10) Patent No.: US 11,780,769 B2
(45) Date of Patent: Oct. 10, 2023

(54) METHODS AND APPARATUS FOR FORMING SHAPED ARTICLES, SHAPED ARTICLES, METHODS FOR MANUFACTURING LIQUID LENSES, AND LIQUID LENSES

(71) Applicant: CORNING INCORPORATED, Corning, NY (US)

(72) Inventors: Melinda Ann Drake, Corning, NY (US); Lisa Ann Lamberson, Painted Post, NY (US); Robert Michael Morena, Lindley, NY (US); Linda Frances Reynolds-Heffer, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 577 days.

(21) Appl. No.: 16/754,899

(22) PCT Filed: Oct. 12, 2018

(86) PCT No.: PCT/US2018/055620
§ 371 (c)(1),
(2) Date: Apr. 9, 2020

(87) PCT Pub. No.: WO2019/075334
PCT Pub. Date: Apr. 18, 2019

(65) Prior Publication Data
US 2021/0309564 A1    Oct. 7, 2021

Related U.S. Application Data

(60) Provisional application No. 62/572,172, filed on Oct. 13, 2017.

(51) Int. Cl.
*C03B 17/04* (2006.01)
*C03C 17/04* (2006.01)
(Continued)

(52) U.S. Cl.
CPC ............ *C03C 17/04* (2013.01); *C03B 11/082* (2013.01); *C03C 3/093* (2013.01); *C03C 3/21* (2013.01);
(Continued)

(58) Field of Classification Search
CPC .................................................... C03C 17/04
See application file for complete search history.

(56) References Cited

U.S. PATENT DOCUMENTS 3,961,120 A    6/1976 Hearn et al.
5,514,485 A    5/1996 Ando et al.
(Continued)

FOREIGN PATENT DOCUMENTS

CN    104646837 A  *  5/2015  ......... B23K 26/0604
EP    1927576 A1    6/2008
(Continued)

OTHER PUBLICATIONS

International Search Report and Written Opinion of the International Searching Authority; PCT/US2018/055620; dated Feb. 1, 2019; 18 Pages; Korean Intellectual Property Office.

*Primary Examiner* — Cynthia Szewczyk

(57) ABSTRACT

A method includes depositing a glass frit on sidewalls of a plurality of cavities of a shaped article formed from a glass material, a glass ceramic material, or a combination thereof. The glass frit is heated to a firing temperature above a glass transition temperature of the glass frit to sinter the glass frit into a glaze disposed on the sidewalls of the plurality of cavities.

20 Claims, 8 Drawing Sheets

(51) Int. Cl.
  *C03B 11/08*   (2006.01)
  *C03C 3/093*   (2006.01)
  *C03C 3/21*    (2006.01)
  *C03C 4/00*    (2006.01)
  *C03C 8/04*    (2006.01)
  *C03C 8/08*    (2006.01)
  *C03C 8/14*    (2006.01)
  *C03C 10/00*   (2006.01)
  *C03C 23/00*   (2006.01)
  *G02B 3/12*    (2006.01)
  *C03B 19/01*   (2006.01)
  *G02B 3/14*    (2006.01)
  *G02B 26/00*   (2006.01)

(52) U.S. Cl.
  CPC .............. *C03C 4/0071* (2013.01); *C03C 8/04* (2013.01); *C03C 8/08* (2013.01); *C03C 8/14* (2013.01); *C03C 10/0018* (2013.01); *C03C 23/0025* (2013.01); *G02B 3/12* (2013.01); *C03B 19/01* (2013.01); *C03C 2204/00* (2013.01); *C03C 2207/00* (2013.01); *C03C 2218/17* (2013.01); *C03C 2218/31* (2013.01); *G02B 3/14* (2013.01); *G02B 26/005* (2013.01)

(56) References Cited

U.S. PATENT DOCUMENTS

| 5,876,841 | A  | * | 3/1999  | Banba ............... H01L 23/49883 |
|   |   |   |   | 428/209 |
| 7,791,814 | B2 |  | 9/2010  | D'ardhuy et al. |
| 9,242,891 | B2 |  | 1/2016  | Inokuchi et al. |
| 9,688,571 | B2 |  | 6/2017  | Lee et al. |
| 2006/0117799 | A1 |  | 6/2006  | Miyahara et al. |
| 2008/0090034 | A1 | * | 4/2008  | Harrison ................ B41M 5/395 |
|   |   |   |   | 106/31.13 |
| 2009/0155555 | A1 |  | 6/2009  | Botelho et al. |
| 2009/0308105 | A1 | * | 12/2009 | Pastel ................. H01L 51/5246 |
|   |   |   |   | 65/42 |
| 2010/0068107 | A1 |  | 3/2010  | Tanguy |
| 2011/0183118 | A1 |  | 7/2011  | Lamberson et al. |
| 2012/0282407 | A1 | * | 11/2012 | Singh ....................... C03C 8/14 |
|   |   |   |   | 501/19 |
| 2014/0220309 | A1 |  | 8/2014  | Vogt et al. |
| 2014/0347741 | A1 |  | 11/2014 | Karam et al. |
| 2015/0097165 | A1 | * | 4/2015  | Setz ........................ C03C 17/04 |
|   |   |   |   | 438/46 |
| 2017/0158553 | A1 |  | 6/2017  | Liang et al. |

FOREIGN PATENT DOCUMENTS

WO    2013/050165 A1    4/2013
WO    2017/095987 A1    6/2017

* cited by examiner

METHODS AND APPARATUS FOR FORMING SHAPED ARTICLES, SHAPED ARTICLES, METHODS FOR MANUFACTURING LIQUID LENSES, AND LIQUID LENSES

CROSS-REFERENCE TO RELATED APPLICATIONS

This application claims the benefit of priority under 35 U.S.C. § 371 of International Application No. PCT/US2018/055620, filed on Oct. 12, 2018, which claims the benefit of priority under 35 U.S.C. § 119 of U.S. Provisional Application No. 62/572,172, filed Oct. 13, 2017, the content of each of which is incorporated herein by reference in its entirety.

BACKGROUND

1. Field

This disclosure relates to methods and apparatus for forming shaped articles, which can be used to manufacture liquid lenses.

2. Technical Background

Isothermal glass pressing generally includes pressing a glass plate at a relatively low temperature (e.g., a temperature at which the glass has a relatively high viscosity of $10^{10}$ poise to $10^{12}$ poise) using a polished ceramic or metallic mold. Such high viscosity of the glass helps to prevent the glass from sticking to the mold and to maintain the surface quality of the finished article. The mold complexity and relatively high pressing force generally limits isothermal glass pressing to small glass articles with simple geometries (e.g., ophthalmic lenses).

SUMMARY

Disclosed herein are methods and apparatus for forming shaped articles, shaped articles, methods of manufacturing liquid lenses, and liquid lenses.

Disclosed herein is a method comprising depositing a glass frit on sidewalls of a plurality of cavities of a shaped article comprising a glass material, a glass-ceramic material, or a combination thereof. The glass frit is heated to a firing temperature above a glass transition temperature of the glass frit to sinter the glass frit into a glaze disposed on the sidewalls of the plurality of cavities.

Disclosed herein is a shaped article comprising a plate comprising a glass material, a glass-ceramic material, or a combination thereof. A plurality of cavities is formed in the plate. A glaze is disposed on sidewalls of the plurality of cavities defining glazed sidewalls of the plurality of cavities. The glaze comprises a glass material, a glass-ceramic material, or a combination thereof that is different than the glass material, the glass-ceramic material, or the combination thereof of the plate. The glazed sidewalls of the plurality of cavities have an Ra surface roughness of at most about 200 nm.

Disclosed herein is a liquid lens comprising a lens body comprising a first window, a second window, a cavity disposed between the first window and the second window, and a glaze disposed on a sidewall of the cavity defining a glazed sidewall of the cavity. The lens body comprises a glass material, a glass-ceramic material, or a combination thereof. The glaze comprises a glass material, a glass-ceramic material, or a combination thereof that is different than the glass material, the glass-ceramic material, or the combination thereof of the lens body. A first liquid and a second liquid are disposed within the cavity of the lens body. The first liquid and the second liquid are substantially immiscible with each other and have different refractive indices such that an interface between the first liquid and the second liquid forms a lens. The glazed sidewall of the cavity has a surface roughness of less than or equal to 200 nm.

Disclosed herein is a method of manufacturing a liquid lens, the method comprising depositing a glass frit on sidewalls of a plurality of cavities of a shaped article comprising a glass material, a glass-ceramic material, or a combination thereof. The glass frit is heated to a firing temperature above a glass transition temperature of the glass frit to sinter the glass frit into a glaze disposed on the sidewalls of the plurality of cavities, thereby transforming the sidewalls of the plurality of cavities into glazed sidewalls. A first liquid and a second liquid are deposited in each of the plurality of cavities of the shaped article. The first liquid and the second liquid are substantially immiscible with each other and have different refractive indices such that an interface between the first liquid and the second liquid forms a lens. A cap is bonded to a surface of the shaped article to seal the first liquid and the second liquid within the plurality of cavities of the shaped article and form a liquid lens array.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
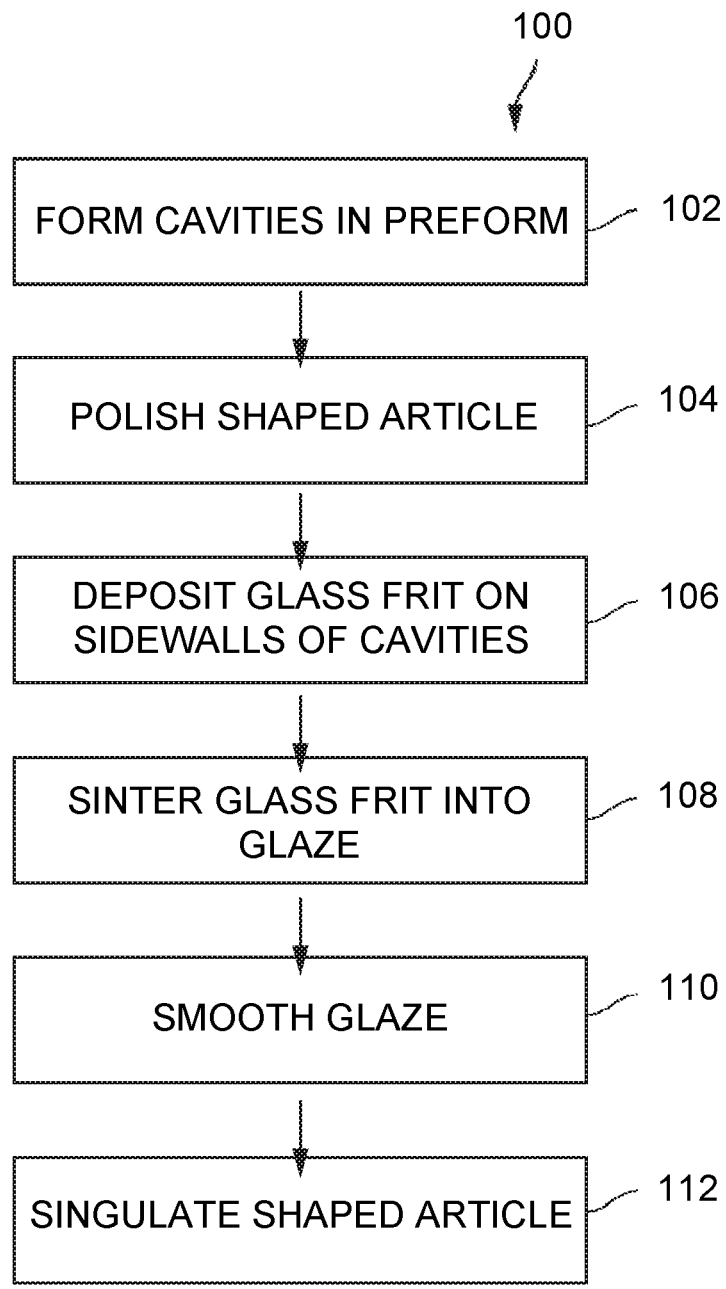
FIG. 1 is a flowchart representing some embodiments of a method for forming a shaped article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, the term "average coefficient of thermal expansion," or "average CTE," refers to the average coefficient of linear thermal expansion of a given material between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

As used herein, the term "surface roughness" means Ra surface roughness determined as described in ISO 25178, Geometric Product Specifications (GPS)—Surface texture: areal, filtered at 25 µm unless otherwise indicated. The surface roughness values reported herein were obtained using a Keyence confocal microscope.

As used herein, the term "formed from" can mean one or more of comprises, consists essentially of, or consists of. For example, a component that is formed from a particular material can comprise the particular material, consist essentially of the particular material, or consist of the particular material.

In various embodiments, a method comprises depositing a glass frit on sidewalls of a plurality of cavities of a shaped article formed from a glass material, a glass ceramic material, or a combination thereof. For example, the plurality of cavities can be formed in a preform formed from the glass material, the glass ceramic material, or the combination thereof to transform the preform into the shaped article. In some embodiments, the method comprises heating the glass frit to a firing temperature above a glass transition temperature of the glass frit to sinter the glass frit into a glaze disposed on the sidewalls of the plurality of cavities. In some embodiments, the glaze disposed on the sidewalls of the plurality of cavities has an Ra surface roughness of at most about 200 nm.

The methods described herein can enable production of relatively large shaped articles having cavities with reduced sidewall roughness compared to conventional pressing methods.

The methods described herein can be used to manufacture shaped glass articles with smooth cavities formed therein. For example, in various embodiments, a shaped article comprises a plate formed from a glass material, a glass-ceramic material, or a combination thereof, and a plurality of cavities formed in the plate. In some embodiments, a glaze is disposed on sidewalls of the plurality of cavities, thereby defining glazed sidewalls of the plurality of cavities. In some of such embodiments, the glaze comprises a glass material, a glass-ceramic material, or a combination thereof that is different than the glass material, the glass-ceramic material, or the combination thereof of the plate. In some embodiments, the glazed sidewalls of the plurality of cavities have an Ra surface roughness of at most about 200 nm.

The methods described herein can be used to manufacture liquid lenses. For example, in various embodiments, a liquid lens comprises a lens body comprising a first window, a second window, a cavity formed in a plate and disposed between the first window and the second window, and a glaze disposed on a sidewall of the cavity, thereby defining a glazed sidewall of the cavity. In some embodiments, the plate comprises a glass material, a glass-ceramic material, or a combination thereof. Additionally, or alternatively, the glaze comprises a glass material, a glass-ceramic material, or a combination thereof that is different than the glass material, the glass-ceramic material, or the combination thereof of the plate. In some embodiments, a first liquid and a second liquid are disposed within the cavity of the lens body. For example, the first liquid and the second liquid are substantially immiscible with each other and have different refractive indices such that an interface between the first liquid and the second liquid forms a lens. In some embodiments, the glazed sidewall of the cavity has a surface roughness of less than or equal to 200 nm.

In various embodiments, a method of manufacturing a liquid lens comprises depositing a glass frit on sidewalls of a plurality of cavities of a shaped article comprising a glass material, a glass-ceramic material, or a combination thereof. For example, the plurality of cavities can be formed in a preform comprising the glass material, the glass ceramic material, or the combination thereof to transform the preform into the shaped article. In some embodiments, the glass frit is heated to a firing temperature above a glass transition temperature of the glass frit to sinter the glass frit into a glaze disposed on the sidewalls of the plurality of cavities, thereby transforming the sidewalls of the plurality of cavities into glazed sidewalls. In some embodiments, a first liquid and a second liquid are deposited in each of the plurality of cavities of the shaped article. For example, the first liquid and the second liquid are substantially immiscible with each other and have different refractive indices such that an interface between the first liquid and the second liquid forms a lens. In some embodiments, a cap is bonded to a surface of the shaped article to seal the first liquid and the second liquid within the plurality of cavities of the shaped article and form a liquid lens array.

FIG. 1 is a flowchart representing some embodiments of a method 100 for forming a shaped article. In some embodiments, method 100 comprises forming a plurality of cavities in a preform at step 102.

Figure 2:
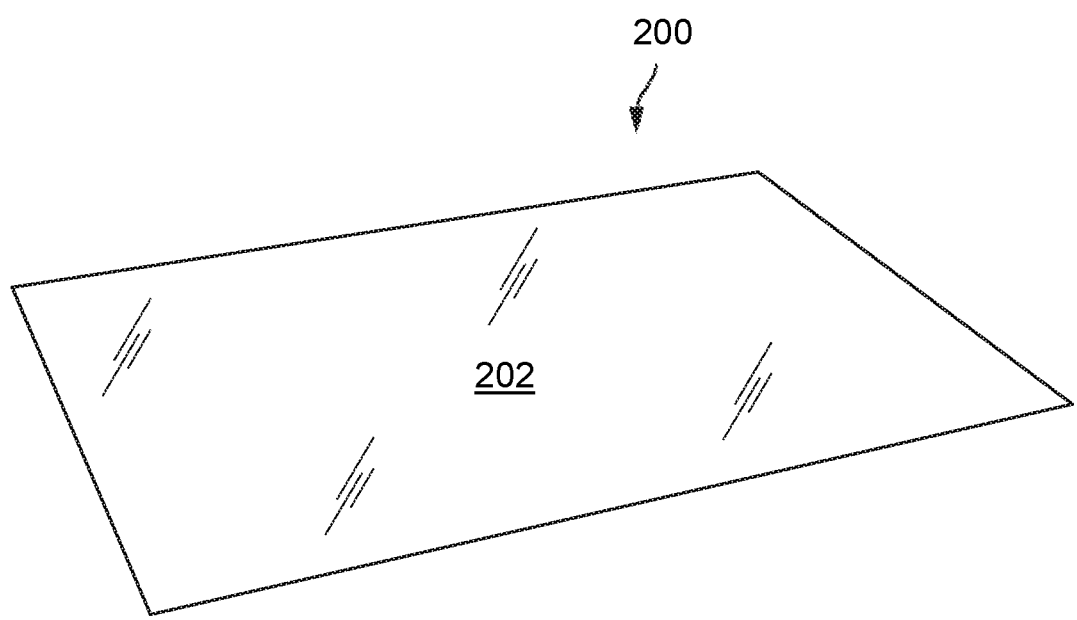
FIG. 2 is a perspective view of some embodiments of a preform that can be used to form a shaped article.
Figure 3:
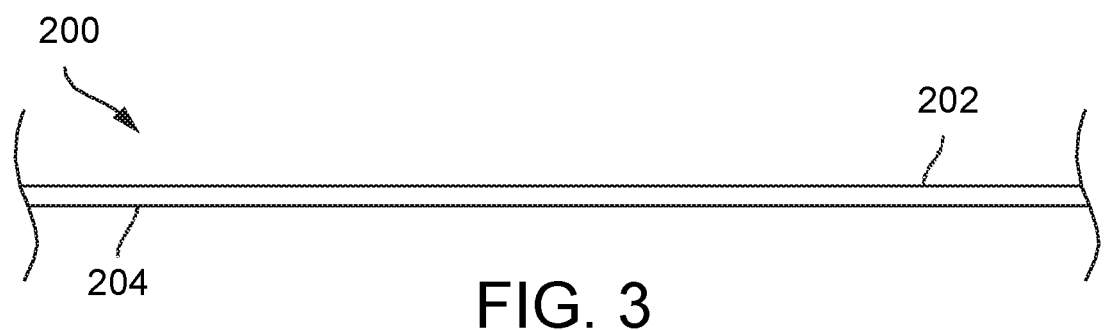
FIG. 3 is a cross-sectional view of the preform shown in FIG. 2.

FIG. 2 is a perspective view of some embodiments of a preform 200, and FIG. 3 is a cross-sectional view of the preform. In some embodiments, preform 200 is configured as a sheet or plate. For example, preform 200 comprises a first surface 202 and a second surface 204 substantially parallel to the first surface. A thickness of preform 200 is a distance between first surface 202 and second surface 204. In some embodiments, preform 200 has a rectangular circumferential or perimetrical shape as shown in FIG. 2. In other embodiments, the preform can have a triangular, circular, elliptical, or other polygonal or non-polygonal circumferential or perimetrical shape. For example, the preform can be a wafer having a substantially circular circumferential shape and with or without a reference flat disposed on an outer circumference or perimeter of the preform. In some embodiments, first surface 202 of preform 200 has a surface area of at least about 100 cm$^2$, at least about 200 cm$^2$, at least about 300 cm$^2$, at least about 400 cm², at least about 500 cm², at least about 600 cm², at least about 700 cm², at least about 800 cm², at least about 900 cm², at least about 1000 cm², at least about 1100 cm², at least about 1200 cm², at least about 1300 cm², at least about 1400 cm², or at least about 1500 cm². For example, preform 200 can be a 6 inch wafer with a surface area of about 121.55 cm², an A6 plate with a surface area of about 155.4 cm², an 8 inch wafer with a surface area of about 162.15 cm², an A5 plate with a surface area of about 310.8 cm², an A4 plate with a surface area of about 623.7 cm², an A3 plate with a surface area of about 1247.4 cm², or another suitably sized preform with a suitable surface area. In some embodiments, preform 200 is formed from a glass material, a glass-ceramic material, or a combination thereof. For example, preform 200 is a glass sheet or plate.

In some embodiments, the forming the plurality of cavities comprises pressing the plurality of cavities in the preform using a mold. Additionally, or alternatively, the forming the plurality of cavities comprises cutting the plurality of cavities in the preform using a laser. Additionally, or alternatively, the forming the plurality of cavities comprises etching the plurality of cavities in the preform using an etchant. The ability to use glass pressing, laser cutting, and/or etching techniques to form the plurality of cavities can be enabled by the methods described herein. For example, depositing glass frit onto sidewalls of the cavities can enable use of cavities formed by glass pressing and/or laser cutting processes that produce sidewalls with relatively rough surfaces that may be unsuitable for use in electrowetting applications. For example, in some embodiments, the surface roughness of the sidewalls after the forming and prior to the depositing the glass frit as described herein (e.g., as-formed) can be at least about 0.5 µm, at least about 1 µm, at least about 2 µm, at least about 3 µm, at least about 4 µm, at least about 5 µm, or at least about 10 µm.

Figure 4:
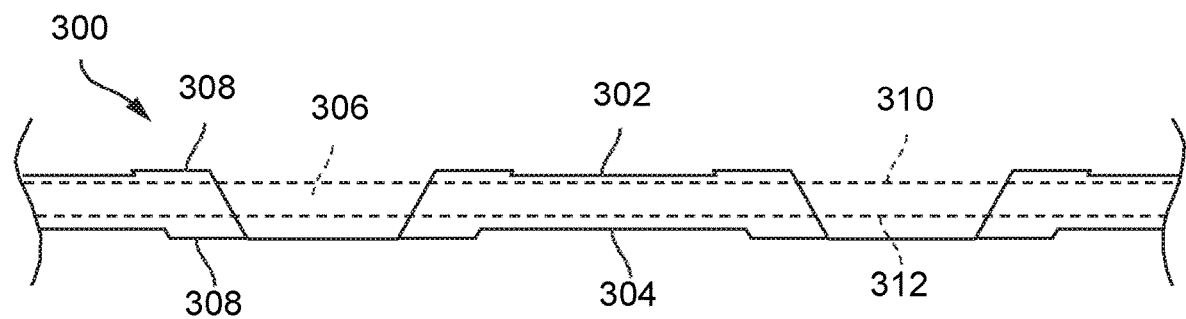
FIG. 4 is a partial cross-sectional schematic view of some embodiments of a shaped article following forming a plurality of cavities.

FIG. 4 is a partial cross-sectional schematic view of some embodiments of a shaped article 300 following the forming the plurality of cavities. Shaped article 300 comprises a first surface 302 corresponding to first surface 202 of preform 200 and a second surface 304 opposite the first surface and corresponding to second surface 204 of the preform. In some embodiments, shaped article 300 comprises a plurality of cavities 306 formed in first surface 302 (e.g., formed by mold features during pressing and/or by laser cutting). In some embodiments, cavities 306 are blind holes that do not extend entirely through shaped article 300 as shown in FIG. 4. Thus, cavities 306 comprise an open end at first surface 302 of shaped article 300 and a closed end near second surface 304 of the shaped article. In other embodiments, the cavities are through-holes extending entirely through the shaped article.

In some embodiments, following the forming the plurality of cavities, shaped article 300 comprises one or more raised portions 308 disposed on one or more surfaces of the shaped article as shown in FIG. 4. For example, such raised portions 308 can result from flow of material of preform 200 during pressing. Thus, in various embodiments, first surface 302 and/or second surface 304 are non-planar following the forming the cavities.

In some embodiments, method 100 comprises polishing the shaped article at step 104 as shown in FIG. 1. For example, polishing shaped article 300 comprises polishing at least one of first surface 302 of the shaped article or second surface 304 of the shaped article following the forming the cavities.

Figure 5:
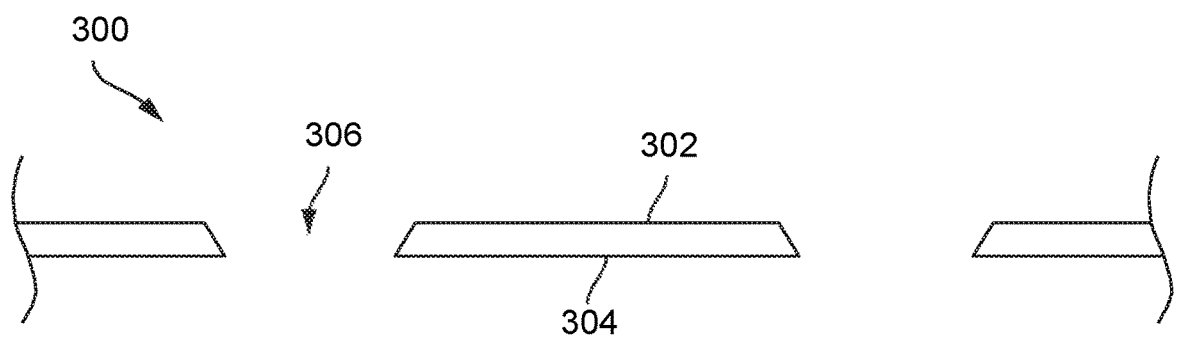
FIG. 5 is a partial cross-sectional schematic view of some embodiments of a shaped article following polishing.

FIG. 5 is a cross-sectional schematic view of some embodiments of shaped article 300 following the polishing.

In some embodiments, the polishing comprises removing material from first surface 302 of shaped article 300. For example, the polishing comprises removing material from first surface 302 down to dashed line 310 shown in FIG. 4. Such polishing can remove raised portions 308 on first surface 302, resulting in a substantially planar surface, excluding cavities 306, as shown in FIG. 5. In some embodiments, the polishing comprises removing material from second surface 304 of shaped article 300. For example, the polishing comprises removing material from second surface 304 down to dashed line 312 shown in FIG. 4. Such polishing can remove raised portions 308 on second surface 304, resulting in a substantially planar surface, excluding cavities 306, as shown in FIG. 5. The polishing can be achieved by mechanical grinding, chemical etching, thermal treatment, or another suitable polishing process. Mechanical grinding can be beneficial in enabling removal of material from the surfaces of the shaped article without altering the sidewalls of the cavities, which can help to preserve the shape and/or surface quality of the sidewalls as described herein.

In some embodiments, after the forming cavities 306 and prior to the polishing, the cavities of shaped article 300 comprise blind holes as shown in FIG. 4 and described herein. In some of such embodiments, the polishing opens the blind holes to transform the plurality of cavities 306 into a plurality of through-holes as shown in FIG. 5. For example, the polishing removes the closed end of the blind holes to open the blind holes and form the through-holes.

In some embodiments, a thickness of shaped article 300 (e.g., a distance between first surface 302 and second surface 304), before or after polishing, can be at most about 5 mm, at most about 4 mm, at most about 3 mm, at most about 2 mm, at most about 1 mm, at most about 0.9 mm, at most about 0.8 mm, at most about 0.7 mm, at most about 0.6 mm, or at most about 0.5 mm. Additionally, or alternatively, the thickness of shaped article 300, before or after polishing, can be at least about 0.1 mm, at least about 0.2 mm, at least about 0.3 mm, at least about 0.4 mm, at least about 0.5 mm, at least about 0.8 mm, at least about 0.9 mm, or at least about 1 mm.

Figure 6:
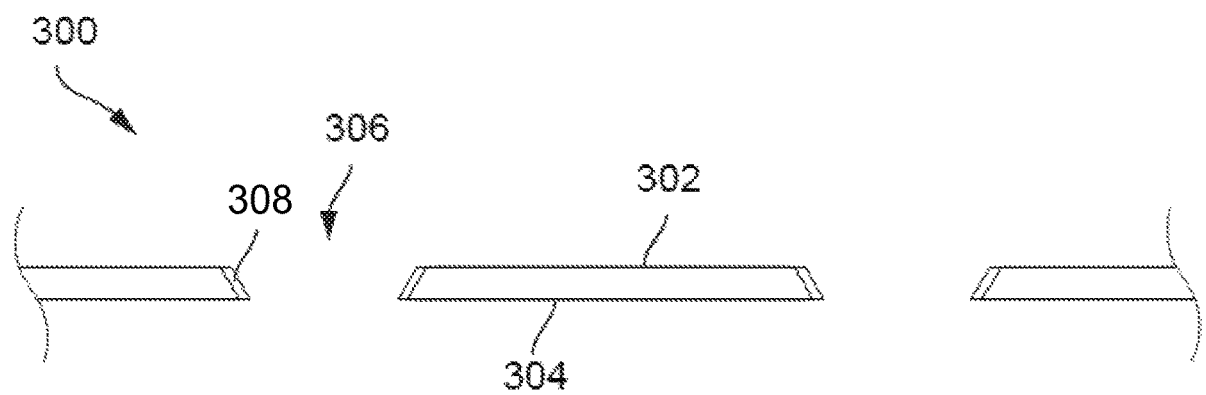
FIG. 6 is a partial cross-sectional schematic view of some embodiments of a shaped article comprising a glass frit deposited on sidewalls of a plurality of cavities.
Figure 7:
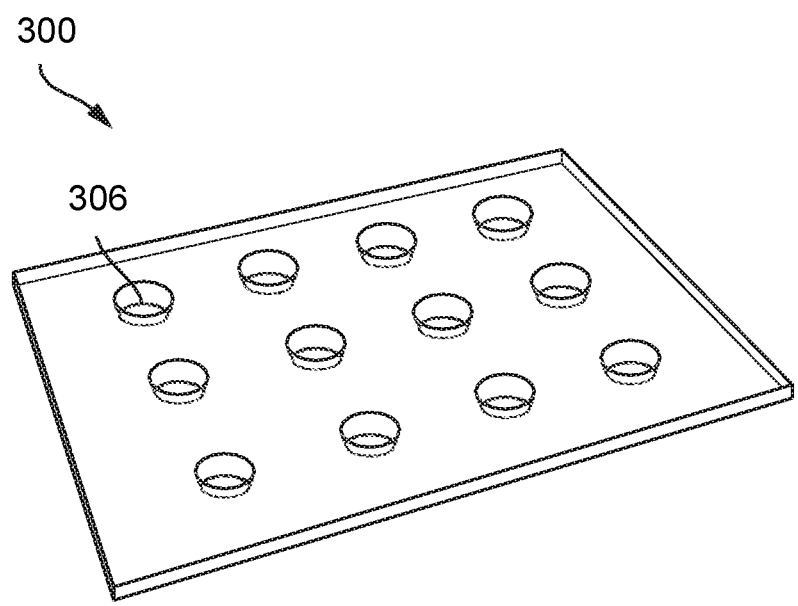
FIG. 7 is a perspective view of the shaped article shown in FIG. 6.

In some embodiments, method 100 comprises depositing a glass frit on sidewalls of the plurality of cavities of the shaped article at step 106 as shown in FIG. 1. For example, method 100 comprises depositing a glass frit on a sidewall of each of the plurality of cavities 306 of shaped article 300. FIG. 6 is a cross-sectional schematic view of some embodiments of shaped article 300 comprising glass frit 308 deposited on the sidewalls of the plurality of cavities 306, and FIG. 7 is a perspective view of the shaped article. In some embodiments, glass frit 308 comprises a glass material, a glass-ceramic material, or a combination thereof. For example, in some embodiments, glass frit 308 comprises a vanadium-phosphate frit, an alkalisilico-borate frit, or a combination thereof. Such glass frits can have a relatively low softening point and/or transition temperature and/or a CTE suitable for the use in the methods and apparatus described herein.

In some embodiments glass frit 308 comprises a binder, such as for example, a polymeric binder. For example, in some embodiments, glass frit 308 is a paste comprising glass particles suspended in a polymeric binder. In some embodiments, glass frit 308 has an average particle size (e.g., of the glass particles in the glass frit) of at most about 1.5 µm, at most about 1.4 µm, at most about 1.3 µm, at most about 1.2 µm, at most about 1.1 µm, at most about 1 µm, at most about 0.9 µm, at most about 0.8 µm, at most about 0.7 µm, at most about 0.6 µm, at most about 0.5 µm, at most about 0.4 µm, at most about 0.3 μm, or at most about 0.2 μm. A small average particle size can enable formation of a glaze with a smooth surface upon firing as described herein.

In some embodiments, glass frit 308 comprises a filler. For example, in some embodiments, glass frit 300 comprises a pigment that enables the glass frit to absorb radiation of a determined wavelength. For example, the pigment is a black pigment (e.g., comprising black spinel) that enables glass frit 308 to absorb near infrared (NIR) radiation. Such absorption can enable laser smoothing of the glaze formed by sintering glass frit 308 as described herein.

In some embodiments, the depositing glass frit 308 comprises depositing the glass frit using a pen dispensing process. For example, the depositing glass frit 308 comprises dispensing the glass frit from a pen dispenser onto the sidewalls of the plurality of cavities 306 at a dispensing speed. In some embodiments, the dispensing speed is at most about 2 mm/s, at most about 1.9 mm/s, at most about 1.8 mm/s, at most about 1.7 mm/s, at most about 1.6 mm/s, or at most about 1.5 mm/s. Dispensing the glass frit from the dispensing pen at a suitable dispensing speed can enable smooth, even coating of the sidewalls of the cavities and formation of a glaze with a low surface roughness as described herein.

In some embodiments, method 100 comprises heating the glass frit to a firing temperature above a glass transition temperature of the glass frit to sinter the glass frit into a glaze disposed on the sidewalls of the plurality of cavities at step 108 as shown in FIG. 1. For example, method 100 comprises heating glass frit 308 disposed on the sidewalls of the plurality of cavities 306 to the firing temperature to sinter the glass frit into a glaze, thereby defining glazed sidewalls of the cavities of shaped article 300 as shown in FIG. 6. The glass transition temperature of the glass frit refers to the glass transition temperature of the glass material, the glass-ceramic material, or the combination thereof in the glass frit, without regard to any binder or filler materials. In some embodiments, the glass transition temperature of glass frit 308 is at most about 500° C., at most about 400° C., or at most about 300° C. Heating the glass frit above its glass transition temperature can enable the glass material, the glass-ceramic material, or the combination thereof of the glass frit to flow and/or consolidate to form the glaze. Additionally, or alternatively, heating the glass frit above its glass transition temperature can remove the binder from the glass frit. Thus, after firing, the glaze can consist essentially of the glass material, the glass-ceramic material, or the combination thereof, substantially free of the binder.

In some embodiments, the firing temperature is below a strain point, an annealing point, and/or a softening point of the glass material, the glass ceramic material, or the combination thereof of shaped article 300. Such a firing temperature can enable sintering glass frit 308 without altering the size and/or shape of the shaped article. Thus, cavities 306 can have substantially the same size and/or shape before and after the firing. In some embodiments, the firing temperature is below the softening point of the glass material, the glass ceramic material, or the combination thereof of shaped article 300. For example, the firing temperature is at least 100° C. below the softening point, at least 200° C. below the softening point, or at least 300° C. below the softening point. Additionally, or alternatively, the firing temperature is above the strain point of the glass material, the glass ceramic material, or the combination thereof of shaped article 300. A firing temperature that is below the softening point and above the strain point can avoid undesirable dimensional changes of the shaped article while enabling stresses in the shaped article (e.g., from the pressing, laser cutting, or other forming process) to be relieved during the firing.

In some embodiments, a CTE of the glass frit is within about $10\times10^{-7}/°$ C. or within about $5\times10^{-7}/°$ C. of a CTE of the glass material, the glass-ceramic material, or the combination thereof of the shaped article. Such a CTE match between glass frit 308 and shaped article 300 can prevent excessive stress at the interface between the glaze and the shaped article, which can prevent the glaze from cracking and/or peeling away from the shaped article.

In various embodiments, the heating the glass frit can be achieved with or without heating the glass article. For example, in some embodiments, the heating glass frit 308 comprises heating glass article 300 with the glass frit disposed thereon (e.g., in an oven or a lehr). In other embodiments, the heating glass frit 308 comprises directing energy directly onto the glass frit 308 (e.g., using a laser sintering process) while limiting the amount of energy directed onto glass article 300.

In some embodiments, method 100 comprises smoothing the glaze disposed on the sidewalls of the plurality of cavities, or smoothing the glazed sidewalls at step 110 as shown in FIG. 1. For example, the method comprises smoothing the glaze by irradiating the glaze with a laser (e.g., using a laser smoothing process). Such laser smoothing can enable local reflow of the glass material, the glass-ceramic material, or the combination thereof of the glaze, thereby further reducing the surface roughness of the glazed sidewalls. In some embodiments, glaze 308 disposed on the sidewalls of the plurality of cavities 306 (e.g., the glazed sidewalls) has an Ra surface roughness, before or after smoothing, of at most about 500 nm, at most about 400 nm, at most about 300 nm, at most about 200 nm at most about 190 nm, at most about 180 nm, at most about 170 nm, at most about 160 nm, at most about 150 nm, at most about 140 nm, at most about 130 nm, at most about 120 nm, at most about 110 nm, at most about 100 nm, at most about 90 nm, at most about 80 nm, at most about 70 nm, at most about 60 nm, or at most about 50 nm.

In some embodiments, cavities 306 have a diameter or width of at most about 5 mm, at most about 4 mm, at most about 3 mm, at most about 2 mm, or at most about 1 mm. Additionally, or alternatively, cavities 306 have a diameter or width of at least about 0.5 mm or at least about 1 mm. The diameter or width of cavities 306 can refer to the diameter or width at first surface 302 of shaped article 300 and/or second surface 304 of the shaped article. Such small cavities with smooth and/or straight sidewalls can be enabled by the methods described herein. In some embodiments, the number of cavities 406 in the plurality of cavities can be at least 100, at least 200, at least 300, at least 400, at least 500, at least 600, at least 700, at least 800, at least 900, at least 1000, at least 1100, at least 1200, at least 1300, at least 1400, or at least 1500. Such a large number of cavities on a single shaped article can enable large-scale production of devices, such as liquid lenses, using wafer manufacturing techniques. In some embodiments, the sidewalls of cavities 306 of shaped article 300 are substantially straight. For example, the deviation of the sidewalls of cavities 306 from linear is within +/−0.25 μm/mm along the sidewall through a thickness of shaped article 300. In some embodiments, cavities 306 have a truncated conical shape with smooth and substantially straight sidewalls.

In some embodiments, method 100 comprises singulating the shaped article at step 112 as shown in FIG. 1. For example, singulating shaped article 300 comprises separating the shaped article into two or more shaped sub-articles following the forming, the polishing, the depositing, the heating, and/or the smoothing. In some embodiments, singluating shaped article 300 comprises cutting or breaking the shaped article along one or more cutting paths. In some embodiments, singulating shaped article 300 comprises dicing the shaped article (e.g., with a mechanical dicing saw, a laser, or another suitable cutting device). For example, the singulating comprises dicing shaped article 300 to form a plurality of shaped sub-articles, and each sub-article comprises a single cavity 406. Such shaped sub-articles can be used to form liquid lenses as described herein.

Figure 8:
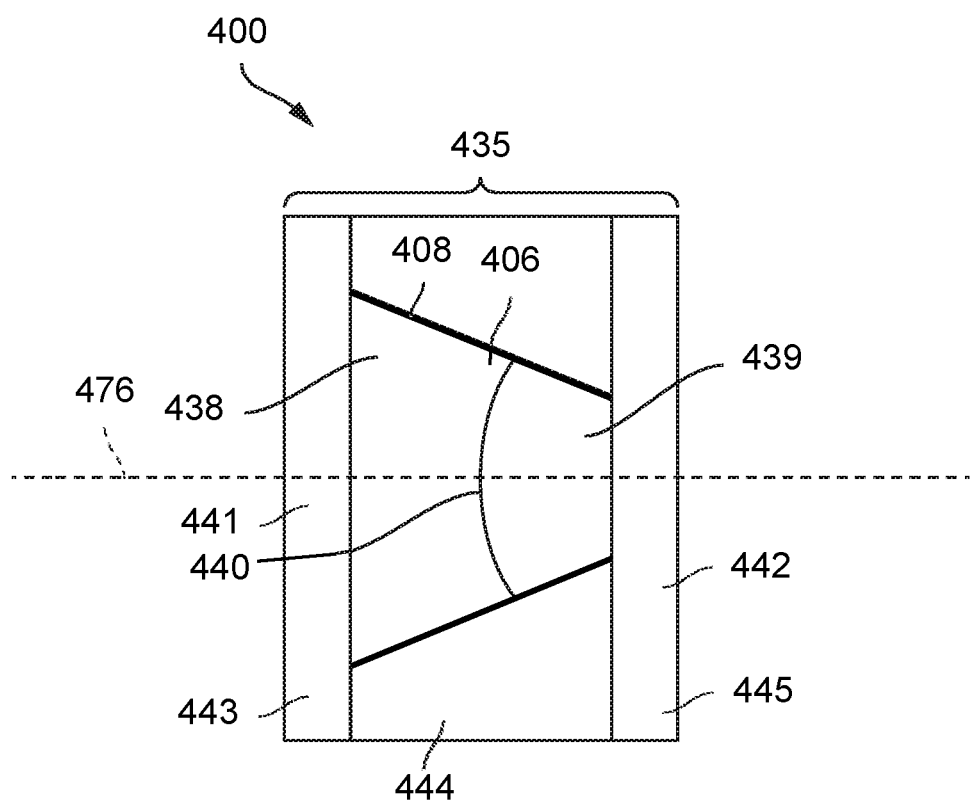
FIG. 8 is a cross-sectional schematic view of some embodiments of a liquid lens comprising a shaped article.

In some embodiments, the methods described herein can be used to manufacture liquid lenses. FIG. 8 is a cross-sectional schematic view of some embodiments of a liquid lens 400 incorporating shaped article 300. In some embodiments, liquid lens 400 comprises a lens body 435 and a cavity 406 formed in the lens body. In some embodiments, a glaze 408 is disposed on a sidewall of cavity 406. Thus, the sidewall of cavity 406 is a glazed sidewall. A first liquid 438 and a second liquid 439 are disposed within cavity 406. In some embodiments, first liquid 438 is a polar liquid or a conducting liquid. Additionally, or alternatively, second liquid 439 is a non-polar liquid or an insulating liquid. In some embodiments, first liquid 438 and second liquid 439 are immiscible with each other and have different refractive indices such that an interface 440 between the first liquid and the second liquid forms a lens. Interface 440 can be adjusted via electrowetting. For example, a voltage can be applied between first liquid 438 and a surface of cavity 406 (e.g., an electrode positioned near the surface of the cavity and insulated from the first liquid) to increase or decrease the wettability of the surface of the cavity with respect to the first liquid and change the shape of interface 440. In some embodiments, adjusting interface 440 changes the shape of the interface, which changes the focal length or focus of liquid lens 400. For example, such a change of focal length can enable liquid lens 400 to perform an autofocus (AF) function. Additionally, or alternatively, adjusting interface 440 tilts the interface relative to an optical axis 476. For example, such tilting can enable liquid lens 400 to perform an optical image stabilization (01S) function. Such adjustment of interface 440 via electrowetting can be sensitive to surface roughness and/or non-linearity of the sidewalls of cavity 406. Thus, the methods described herein for forming shaped article 300 having cavities 306 with smooth and/or substantially straight sidewalls may be beneficial for forming cavity 406 for liquid lens 400. In some embodiments, first liquid 438 and second liquid 439 have substantially the same density, which can help to avoid changes in the shape of interface 440 as a result of changing the physical orientation of liquid lens 400 (e.g., as a result of gravitational forces).

In some embodiments, lens body 435 of liquid lens 400 comprises a first window 441 and a second window 442. In some of such embodiments, cavity 406 is disposed between first window 441 and second window 442. In some embodiments, lens body 435 comprises a plurality of layers that cooperatively form the lens body. For example, in the embodiments shown in FIG. 8, lens body 435 comprises a cap 443, a shaped plate 444, and a base 445. In some embodiments, shaped plate 444 with cavity 406 comprises or is formed from shaped article 300 with cavity 306. For example, shaped plate 444 with cavity 406 is formed as described herein with reference to shaped article 300 with cavity 306, cap 443 is bonded to one side (e.g., an object side) of the shaped plate, and base 445 is bonded to the other side (e.g., an image side) of the shaped plate such that the cavity is covered on opposing sides by the cap and the base. Thus, a portion of cap 443 covering cavity 406 serves as first window 441, and a portion of base 445 covering the cavity serves as second window 442. In other embodiments, the cavity is a blind hole that does not extend entirely though the shaped plate. In such embodiments, the base can be omitted, and the closed end of the cavity can serve as the second window.

In some embodiments, cavity 406 has a truncated conical shape as shown in FIG. 8 such that a cross-sectional area of the cavity decreases along optical axis 476 in a direction from the object side to the image side. Such a tapered cavity can help to maintain alignment of interface 440 between first liquid 438 and second liquid 439 along optical axis 476. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 400 through first window 441, is refracted at interface 440 between first liquid 438 and second liquid 439, and exits the liquid lens through second window 442. In some embodiments, cap 443 and/or base 445 comprise a sufficient transparency to enable passage of image light. For example, cap 443 and/or base 445 comprise a polymeric material, a glass material, a ceramic material, a glass-ceramic material, or a combination thereof. In some embodiments, outer surfaces of cap 443 and/or base 445 are substantially planar. Thus, even though liquid lens 400 can function as a lens (e.g., by refracting image light passing through interface 440), outer surfaces of the liquid lens can be flat as opposed to being curved like the outer surfaces of a fixed lens. In other embodiments, outer surfaces of the cap and/or the base are curved. Thus, the liquid lens comprises an integrated fixed lens. In some embodiments, shaped plate 444 comprises a glass material, a glass-ceramic material, or a combination thereof as described herein. Because image light can pass through the cavity through shaped plate 444, the shaped plate may or may not be transparent.

Although FIG. 8 illustrates a single liquid lens 400, liquid lenses can be manufactured in arrays using a wafer manufacturing process as described herein. For example, a liquid lens array comprises a plurality of liquid lenses 400 attached in a plate or wafer. Thus, prior to singulation to form single liquid lens 400, shaped plate 444 comprises a plurality of cavities 406. Additionally, or alternatively, prior to singulation, cap 443 comprises a plate with a plurality of first windows 441 corresponding to the plurality of cavities 406. Additionally, or alternatively, prior to singulation, base 445 comprises a plate with a plurality of second windows 442 corresponding to the plurality of cavities 406. After formation, the liquid lens array can be singulated to form the individual liquid lenses 400.

Figure 9:
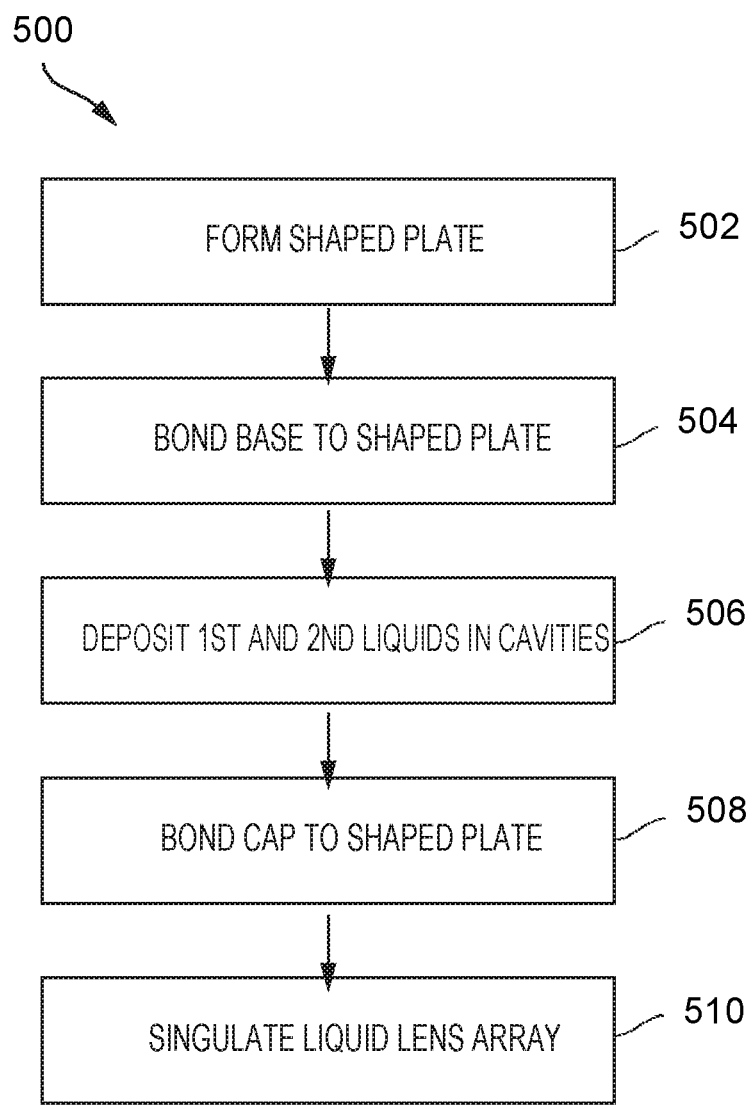
FIG. 9 is a flowchart representing some embodiments of a method for manufacturing a liquid lens.

FIG. 9 is a flowchart representing some embodiments of a method 500 for manufacturing a liquid lens. In some embodiments, method 500 comprises forming a shaped plate comprising a plurality of cavities. For example, method 500 comprises forming shaped plate 444 comprising the plurality of cavities 406 at step 502 (e.g., as described herein with reference to forming shaped article 300 comprising the plurality of cavities 306).

In some embodiments, method 500 comprises bonding a base to a surface of the shaped plate. For example, method 500 comprises bonding base 445 to shaped plate 444 at step 504. The bonding comprises, for example, laser bonding, adhesive bonding, or another suitable bonding technique.

In some embodiments, method 500 comprises depositing first and second liquids into the plurality of cavities of the shaped plate. For example, method 500 comprises depositing first liquid 438 and second liquid 439 in each of the plurality of cavities 406 of shaped plate 444 at step 506.

In some embodiments, method 500 comprises bonding a cap to a surface of the shaped plate to seal the first liquid and the second liquid within the plurality of cavities and form a liquid lens array. For example, method 500 comprises bonding cap 443 to shaped plate 444 to seal first liquid 438 and second liquid 439 within the plurality of cavities 406 of the shaped plate at step 508. The bonding comprises, for example, laser bonding, adhesive bonding, or another suitable bonding technique.

In some embodiments, method 500 comprises singulating the liquid lens array to form a plurality of individual liquid lenses. For example, method 500 comprises singulating the liquid lens array comprising cap 443, shaped plate 444, and optionally, base 445 to form the plurality of individual liquid lenses 400 at step 510. The singulating comprises, for example, mechanical dicing, laser dicing, or another suitable dicing technique.

The methods described herein for forming shaped articles with a plurality of cavities formed therein can enable large-scale production of shaped plates having cavities with sufficiently smooth surfaces to be used in electrowetting applications, which in turn, can enable efficient manufacturing of liquid lens arrays and/or singulated liquid lenses.

Although FIG. 9 illustrates using the methods described herein to manufacture liquid lenses, other embodiments are included in this disclosure. For example, in other embodiments, the methods and apparatus described herein can be used to make shaped articles for use in optics, biological, microfluidic, or any other suitable applications.

EXAMPLES

Various embodiments will be further clarified by the following examples.

Glass frits with the compositions and properties shown in Table 1 were deposited on sidewalls of truncated conical cavities formed in an alkali-aluminosilicate glass commercially available as Corning® Gorilla® Glass 3 from Corning Incorporated (Corning, N.Y.) as described below. The cavities were formed in the glass articles by laser cutting. The glass article had a strain point of 574° C., an annealing point of 628° C., a softening point of 900° C., and a CTE of $75.8 \times 10^{-7}$/° C. The compositions in Table 1 are given in mol % on an oxide basis. The compositions of glass frits 1-3 are the same, but the glass frits have different particles sizes. The compositions of glass frits 4 and 5 are the same, but glass frit 5 includes a filler material that is absent from glass frit 4. The glass frits were sintered as described below to form glazed sidewalls of the cavities.

TABLE 1

Glass Frit Compositions and Properties

| Oxides (mole %) | Frit 1 | Frit 2 | Frit 3 | Frit 4 | Frit 5 |
|---|---|---|---|---|---|
| $V_2O_5$ | 50 | 50 | 50 | 0 | 0 |
| $P_2O_5$ | 15 | 15 | 15 | 0 | 0 |
| $Fe_2O_3$ | 10 | 10 | 10 | 0 | 0 |
| $TeO_2$ | 15 | 15 | 15 | 0 | 0 |
| $Bi_2O_3$ | 10 | 10 | 10 | 0 | 0 |
| $K_2O$ | 0 | 0 | 0 | 22.5 | 22.5 |
| ZnO | 0 | 0 | 0 | 10 | 10 |
| $Al_2O_3$ | 0 | 0 | 0 | 4 | 4 |
| $B_2O_3$ | 0 | 0 | 0 | 38.5 | 38.5 |
| $SiO_2$ | 0 | 0 | 0 | 25 | 25 |
| Filler material | | | | | 10% by weight spinel pigment |
| Property data | | | | | |
| Glass transition temperature ($T_g$) ° C. | 298 | 298 | 298 | 470 | 470 |
| Coefficient of thermal expansion, $10^{-7}$/° C. | 90 | 90 | 90 | 84.3 | 84.3 |
| Softening point ° C. | 370 | 370 | 370 | 596 | 596 |
| Average particle size (µm) | 1.5 | 0.9 | 0.2 | | |

Example 1

The vanadium-phosphate frit shown as Frit 1 in Table 1 was deposited on the sidewalls of the cavities formed in the shaped glass article using a precision pen dispenser at a dispensing speed of 1.8 mm/s. The deposited frit was sintered by heating the glass frit from room temperature to 380° C. at 5° C./min in an air atmosphere, further heating the glass frit to 400° C. at 5° C./min in a nitrogen atmosphere, holding the glass frit at 400° C. for 1 hr in the nitrogen atmosphere, then cooling the glass frit to room temperature at 5° C./min in the nitrogen atmosphere. The resulting glaze had a good profile with glossy appearance, an Ra surface roughness of 280 nm, and an Rq surface roughness of 410 nm.

Example 2

The vanadium-phosphate frit shown as Frit 1 in Table 1 was deposited on the sidewalls of the cavities formed in the shaped glass article using a precision pen dispenser at a dispensing speed of 1.9 mm/s. The deposited frit was sintered by heating the glass frit from room temperature to 380° C. at 5° C./min in an air atmosphere, further heating the glass frit to 400° C. at 5° C./min in a nitrogen atmosphere, holding the glass frit at 400° C. for 1 hr in the nitrogen atmosphere, then cooling the glass frit to room temperature at 5° C./min in the nitrogen atmosphere. The resulting glaze had a good profile with glossy appearance, an Ra surface roughness of 700 nm, and an Rq surface roughness of 1110 nm.

Comparing Example 2 to Example 1 suggests that the lower dispensing speed enables reduced surface roughness.

Example 3

The vanadium-phosphate frit shown as Frit 3 in Table 1 was deposited on the sidewalls of the cavities formed in the shaped glass article using a precision pen dispenser at a dispensing speed of 2 mm/s. The deposited frit was sintered by heating the glass frit from room temperature to 400° C.

at 5° C./min in a nitrogen atmosphere, then holding the glass frit at 400° C. for 1 hr in the nitrogen atmosphere. The glaze was laser smoothed by irradiating the glaze with a laser at a power of 25 Watts. The resulting glaze had a good profile with glossy appearance, an Ra surface roughness of 200 nm, and an Rq surface roughness of 282 nm.

Comparing Example 3 to Example 1 suggests that the smaller particle size of the glass frit and the laser-smoothing enables reduced surface roughness.

Example 4

The alkalisilico-borate frit shown as Frit 4 in Table 1 was deposited on the sidewalls of the cavities formed in the shaped glass article using a precision pen dispenser at a dispensing speed of 2 mm/s. The deposited frit was sintered by heating the glass frit from room temperature to 300° C. at 5° C./min in an air atmosphere, holding the glass frit at 300° C. for 1 hr in the air atmosphere, further heating the glass frit to 630° C. at 5° C./min in the air atmosphere, then holding the glass frit at 630° C. in the air atmosphere for 30 min. The resulting glaze had a good profile with glossy appearance, an Ra surface roughness of 122 nm, and an Rq surface roughness of 160 nm.

Example 5

The alkalisilico-borate frit shown as Frit 5 in Table 1 was deposited on the sidewalls of the cavities formed in the shaped glass article using a precision pen dispenser at a dispensing speed of 2 mm/s. The deposited frit was sintered by heating the glass frit from room temperature to 300° C. at 5° C./min in an air atmosphere, holding the glass frit at 300° C. for 1 hr in the air atmosphere, further heating the glass frit to 630° C. at 5° C./min in the air atmosphere, then holding the glass frit at 630° C. in the air atmosphere for 30 min. The resulting glaze had a good profile with glossy appearance, an Ra surface roughness of 190 nm, and an Rq surface roughness of 239 nm.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method comprising:
depositing a glass frit on sidewalls of a plurality of cavities of a shaped article comprising a glass material, a glass-ceramic material, or a combination thereof;
heating the glass frit to a firing temperature above a glass transition temperature of the glass frit and below a strain point of the glass material, the glass-ceramic material, or the combination thereof of the shaped article to sinter the glass frit into a glaze disposed on the sidewalls of the plurality of cavities;
wherein the glaze disposed on the sidewalls of the plurality of cavities has an Ra surface roughness of at most about 200 nm; and
wherein the depositing the glass frit comprises dispensing the glass frit from a pen dispenser onto the sidewalls at a dispensing speed of at most about 1.8 mm/s.

2. The method of claim 1, comprising forming the plurality of cavities in a preform comprising the glass material, the glass-ceramic material, or the combination thereof to transform the preform into the shaped article.

3. The method of claim 2, wherein the forming the plurality of cavities in the preform comprises cutting the plurality of cavities in the preform using a laser.

4. The method of claim 2, wherein the forming the plurality of cavities in the preform comprises pressing the plurality of cavities in the preform using a mold.

5. The method of claim 1, comprising smoothing the glaze by irradiating the glaze with a laser.

6. The method of claim 1, comprising polishing at least one of a first surface or a second surface of the shaped article.

7. The method of claim 6, wherein prior to the polishing, the plurality of cavities are blind holes, and the polishing opens the blind holes to form a plurality of through holes.

8. The method of claim 1, wherein the glass transition temperature of the glass frit is at most about 500° C.

9. The method of claim 1, wherein a coefficient of thermal expansion of the glass frit is within about $10 \times 10^{-7}/°$ C. of a coefficient of thermal expansion of the glass material, the glass-ceramic material, or the combination thereof of the shaped article.

10. A method comprising:
depositing a glass frit on sidewalls of a plurality of cavities of a shaped article comprising a glass material, a glass-ceramic material, or a combination thereof;
heating the glass frit to a firing temperature above a glass transition temperature of the glass frit and below a strain point of the glass material, the glass-ceramic material, or the combination thereof of the shaped article to sinter the glass frit into a glaze disposed on the sidewalls of the plurality of cavities;
wherein the glaze disposed on the sidewalls of the plurality of cavities has an Ra surface roughness of at most about 500 nm; and
wherein the depositing the glass frit comprises dispensing the glass frit from a pen dispenser onto the sidewalls at a dispensing speed of at most about 2.0 mm/s.

11. The method of claim 10, comprising forming the plurality of cavities in a preform comprising the glass material, the glass-ceramic material, or the combination thereof to transform the preform into the shaped article.

12. The method of claim 10, comprising smoothing the glaze by irradiating the glaze with a laser.

13. The method of claim 10, comprising polishing at least one of a first surface or a second surface of the shaped article.

14. The method of claim 10, wherein the glass transition temperature of the glass frit is at most about 500° C.

15. The method of claim 10, wherein a coefficient of thermal expansion of the glass frit is within about $10 \times 10^{-7}/°$ C. of a coefficient of thermal expansion of the glass material, the glass-ceramic material, or the combination thereof of the shaped article.

16. A method comprising:
depositing a glass frit on sidewalls of a plurality of cavities of a shaped article comprising a glass material, a glass-ceramic material, or a combination thereof;
heating the glass frit to a firing temperature above a glass transition temperature of the glass frit and below a strain point of the glass material, the glass-ceramic material, or the combination thereof of the shaped article to sinter the glass frit into a glaze disposed on the sidewalls of the plurality of cavities;
wherein the glaze disposed on the sidewalls of the plurality of cavities has an Ra surface roughness of at most about 200 nm; and wherein the depositing the glass frit comprises dispensing the glass frit from a pen dispenser onto the sidewalls at a dispensing speed of at most about 2.0 mm/s.

17. The method of claim 16, comprising forming the plurality of cavities in a preform comprising the glass material, the glass-ceramic material, or the combination thereof to transform the preform into the shaped article.

18. The method of claim 16, comprising smoothing the glaze by irradiating the glaze with a laser.

19. The method of claim 16, wherein the glass transition temperature of the glass frit is at most about 500° C.

20. The method of claim 16, wherein a coefficient of thermal expansion of the glass frit is within about $10 \times 10^{-7}/°$ C. of a coefficient of thermal expansion of the glass material, the glass-ceramic material, or the combination thereof of the shaped article.

* * * * *